UNITED STATES PATENT OFFICE.

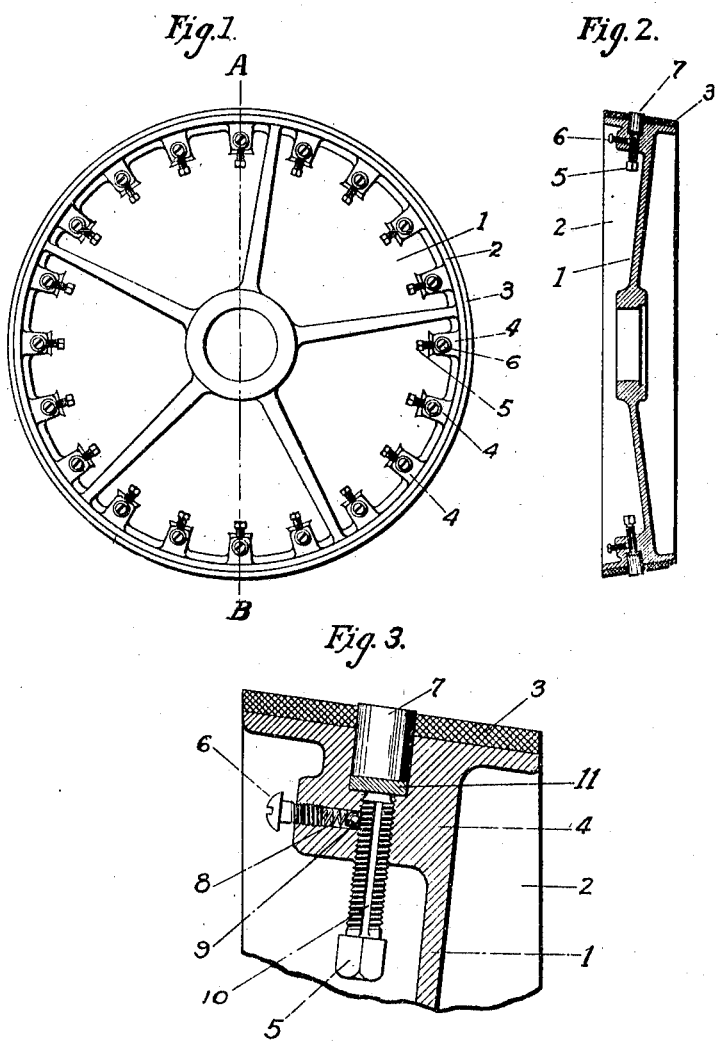

FRANK JUNGJOHANN, OF DAVENPORT, IOWA.

MEANS FOR ADJUSTING CLUTCH-INSERTS.

1,041,093.  Specification of Letters Patent.  Patented Oct. 15, 1912.

Application filed January 31, 1912. Serial No. 674,596.

*To all whom it may concern:*

Be it known that I, FRANK JUNGJOHANN, a citizen of the United States of America, and resident of Davenport, Scott county, Iowa, have invented a certain new and useful Improvement in Means for Adjusting Clutch-Inserts, of which the following is a specification.

My invention relates to improvements in friction devices generally, the friction surfaces of which are provided with inserts of pliable material (such as cork). While it could be applied most advantageously to belt driven pulleys, brakes, etc., it is directed more especially to friction clutches, particularly of the cone type commonly used in automobile power transmission; and the objects of my improvement are first, to perpetuate the effectiveness of the friction surfaces; second, to afford simple and absolutely dependable means for the proper adjustment of the friction inserts; third, to greatly reduce the present cost of readjustments and fourth, to make the task of adjustment possible by the most unskilled.

With the cork inserts properly adjusted, the cone clutch has proved a most satisfactory and efficient device, but when the inserts wear to an extent that the steel surface of one member of the clutch contacts the usual leather covered surface of the other member, it loses its steady grip and becomes spasmodic and jerky in its action. Readjustment of the inserts becomes necessary. In connection with automobiles, this adjustment is not only difficult and expensive but requires the services of the skilled mechanic. It is the common practice to dismantle the machinery, remove the clutch, drive the corks out of their retaining sockets, place paper shims in the bottom thereof and drive the corks back to place, exercising the greatest care to insure their proper adjustment relative one to the other and to the surface of the retaining rim.

The main object of my invention is to provide simple, accurately graduated adjusting means whereby the most unskilled can quickly and easily readjust the inserts without removal of the clutch or of the inserts.

While inserts have been provided with adjusting means prior to my invention, the exact degree of adjustment could not be controlled. In fact these prior devices were applied to belted pulleys wherein the necessity for the minutely exact adjustment of the inserts relative to one another and to the face of the friction surface, did not exist.

My invention is directed especially to means which absolutely control both uniformity and degree of adjustment, conditions absolutely essential when applied to cone type of friction clutches.

I attain these objects by the mechanism illustrated in the accompanying drawings, in which—

Figure 1 is a front elevation of the inside or male member of a cone friction clutch showing my improvement applied thereto. Fig. 2 is a sectional view taken on dotted line A—B, Fig. 1. Fig. 3 is an enlarged view, partly in section, showing my invention in detail.

Similar numerals refer to similar parts throughout the several views.

As thus illustrated the power transmitting device involves the usual friction member 1 provided with the bevel or cone shaped friction rim 2 and leather covering 3, which is made to coöperate in the usual manner with the opposing or cup portion of the clutch. As the clutch proper or the mechanism for operating same is no part of my invention, same are not shown.

Pendant from the under side of the friction rim and adjacent to the web of member 1 are a multiplicity of bosses 4 provided with recesses or sockets for the reception of non-metallic inserts, such as cork or other pliable material.

Screw threaded into the outer end of each boss and communicating with the bottom of the insert socket, is the graduated adjusting screw 5, and screw threaded into the side of the boss and in alinement with adjusting screw 5 is the retaining screw 6. While the opening in the side of the boss is made to communicate with adjusting screw 5, retaining screw 6 enters said opening only part way, the remaining portion of the opening being occupied by the coil spring 8 and indicator point or ball 9. The adjusting screw 5 is provided with the narrow longitudinal slots 10 located on the quarter, extending the threaded length of the threaded portion and to a depth equal to that of the threads or a trifle more. Screw 5 is made to contact the metal plate or washer 11 located under the insert 7. The inserts pass through perforations in the leather covering 3 and caused to extend sufficiently beyond to contact the inner face of the opposing member of the clutch when in locked position (not shown).

When, from continued use the protruding portion of the inserts 7 wear sufficiently to permit the opposing member of the clutch to come in direct contact with the leather surface 3, the clutch at once, loses that "steady grip" so characteristic of the friction surface afforded by the exposed inserts.

To avoid the heretofore expensive, laborious and uncertain task of readjusting the inserts and to enable the most unskilled to quickly, easily and properly adjust them, I have provided adjusting screw 5 with a number of slots 10, usually four, placed quartering. Indicator point or ball 9 normally rests in one of the slots, being firmly but yieldingly held in such position by the spring 8 within a force as determined by the position in or out of the retaining screw 6. Now by turning screw 5 until the ball 9 has been forced out of one slot and made to enter the next one, the insert 7 has been advanced a distance as determined by the distance apart of the slots and the number of threads per inch on screw 5. The maximum adjustment permissible of inserts 7 having been previously determined, the slots and threads are proportioned accordingly. It is thus seen that an absolutely positive and accurate adjustment is imparted to the insert by simply turning the adjusting screw until the indicator ball has made one "pulsation," that is forced out of one slot into the next. A task requiring no skill whatever. As these pulsations are distinctly felt in the act of turning the adjusting screw, it is unnecessary that the parts be in sight, it can be entirely accomplished by the sense of touch, a most desirable situation in connection with an automobile, thus avoiding dismantling or removing the parts, which are usually difficult of access.

I am aware that prior to my invention, a common screw adjustment has been applied to inserts in connection with belted pulleys, but from the foregoing, it is readily seen that without some means to absolutely determine the degree of adjustment, the plain screw, even though provided with lock nuts, must fail. I therefore do not claim such combination broadly; but

What I claim as my invention is:

1. In combination, power transmitting devices having friction surfaces provided with inserts, and devices adapted to adjust said inserts a positive predetermined degree relative to the friction surface.

2. In combination, power transmitting devices having friction surfaces provided with non-metallic inserts, and devices adapted to adjust said inserts a fixed predetermined degree relative to the friction surface.

3. In combination, power transmitting devices having friction surfaces provided with non-metallic inserts, devices adapted to adjust said inserts relative to the friction surface, and means adapted to positively indicate the degree or extent of adjustment.

4. In combination, friction devices, having friction surfaces provided with inserts, devices adapted to adjust said inserts relative to the friction surface, and means adapted to positively indicate the degree or amount of adjustment.

5. In combination, friction devices having friction surfaces provided with inserts, insert adjusting devices, and degree-of-adjustment indicating means controlled by said adjusting devices.

6. In combination, power transmitting devices having friction surfaces provided with non-metallic inserts, insert adjusting devices, and degree-of-adjustment indicating means controlled by said adjusting devices.

7. In combination, friction devices having friction surfaces provided with inserts, and graduated screw devices adapted to adjust to a predetermined degree said inserts relative to the friction surface.

8. In combination, friction devices having friction surfaces provided with inserts, graduated screw insert adjusting device, and indicating means adapted to determine degree or amount of adjustment.

9. In combination, power transmitting devices having friction surfaces provided with inserts, graduated screw insert adjusting device, and indicating means controlled by said graduated screw adapted to determine degree or amount of adjustment.

10. In combination, a cone friction clutch having friction surfaces provided with inserts, graduated screw insert adjusting device, and indicating means controlled by said graduated screw adapted to determine degree or amount of adjustment.

11. In combination, a friction clutch member provided with bosses, recesses in said bosses, cork inserts in said recesses, adjusting screws threaded into said bosses and communicating with said recesses, a plurality of slots in said adjusting screws, an indicating ball engaging one of said slots, a spring engaging said ball, and a retaining screw engaging said spring, substantially as shown and described.

12. In combination, a friction clutch member provided with bosses, recesses in said bosses, inserts in said recesses, adjusting screws threaded into said bosses, longitudinal slots in said adjusting screws, and a spring actuated indicator adapted to engage said slots.

13. In combination, a friction clutch member provided with bosses, recesses in said bosses, non-metallic inserts in said recesses, adjusting screws threaded into end of said bosses, longitudinal slots in said adjusting screws, retaining screws threaded in the side of said bosses, balls engaging said slots, and springs engaging said balls and said retaining screws.

Signed by me this 27th day of Jan., 1912.

FRANK JUNGJOHANN.

Witnesses:
A. H. STOLTENBERG,
H. JUNGJOHANN.